United States Patent [19]
Smoot et al.

[11] 3,808,977
[45] May 7, 1974

[54] SWITCH FOR VEHICLE GUIDEWAY

[75] Inventors: Charles H. Smoot, Wayzata; Lowell A. Kleven, Bloomington; Gary J. Wirth, St. Paul, all of Minn.

[73] Assignee: Uniflo Systems Company, Edina, Minn.

[22] Filed: Jan. 18, 1971

[21] Appl. No.: 107,199

[52] U.S. Cl. .............. 104/130, 104/105, 104/23 FS
[51] Int. Cl. ............................................ B61b 13/08
[58] Field of Search .......... 104/244, 23 FS, 96, 130, 104/105, 134

[56] References Cited
UNITED STATES PATENTS

| | | | |
|---|---|---|---|
| 3,650,216 | 3/1972 | Broome | 104/130 |
| 3,113,529 | 12/1963 | Maestrelli | 104/130 |
| 3,500,765 | 3/1970 | Easton | 104/23 FS |
| 3,242,876 | 3/1966 | Berggren | 104/134 |
| 3,098,454 | 7/1963 | Maestrelli | 104/130 |
| 3,276,392 | 10/1966 | Cockerell | 104/23 FS |
| 3,340,822 | 9/1967 | Delasalle | 104/130 |
| 3,643,600 | 2/1972 | Bertin | 104/130 |

*Primary Examiner*—Gerald M. Forlenza
*Assistant Examiner*—D. W. Keen
*Attorney, Agent, or Firm*—Dugger, Johnson & Westman

[57] ABSTRACT

A positive action switch for air levitated vehicles operating on guideways whereby the vehicle can be switched from the main guideway to a spur or side guideway in response to predetermined signals.

16 Claims, 9 Drawing Figures

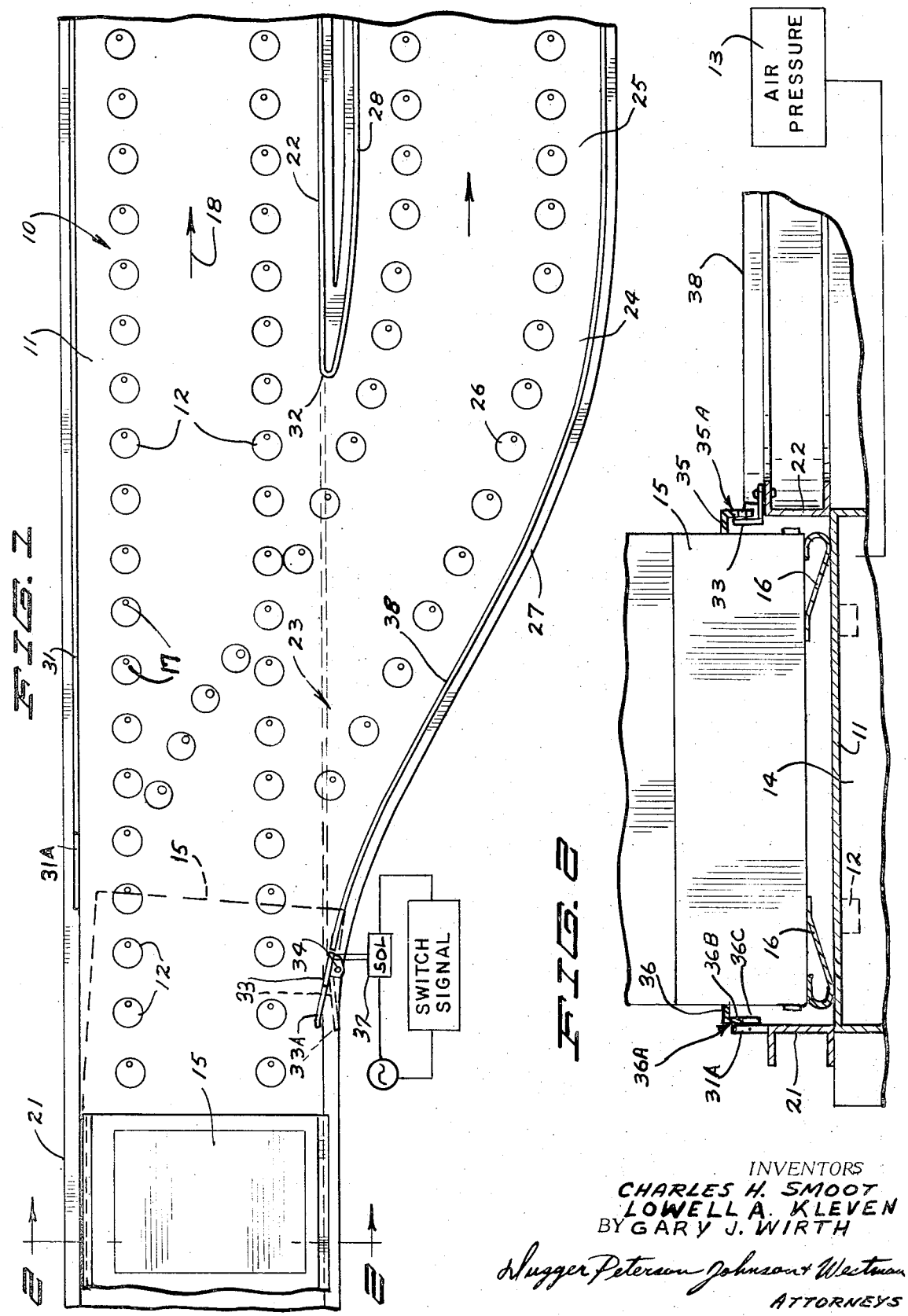

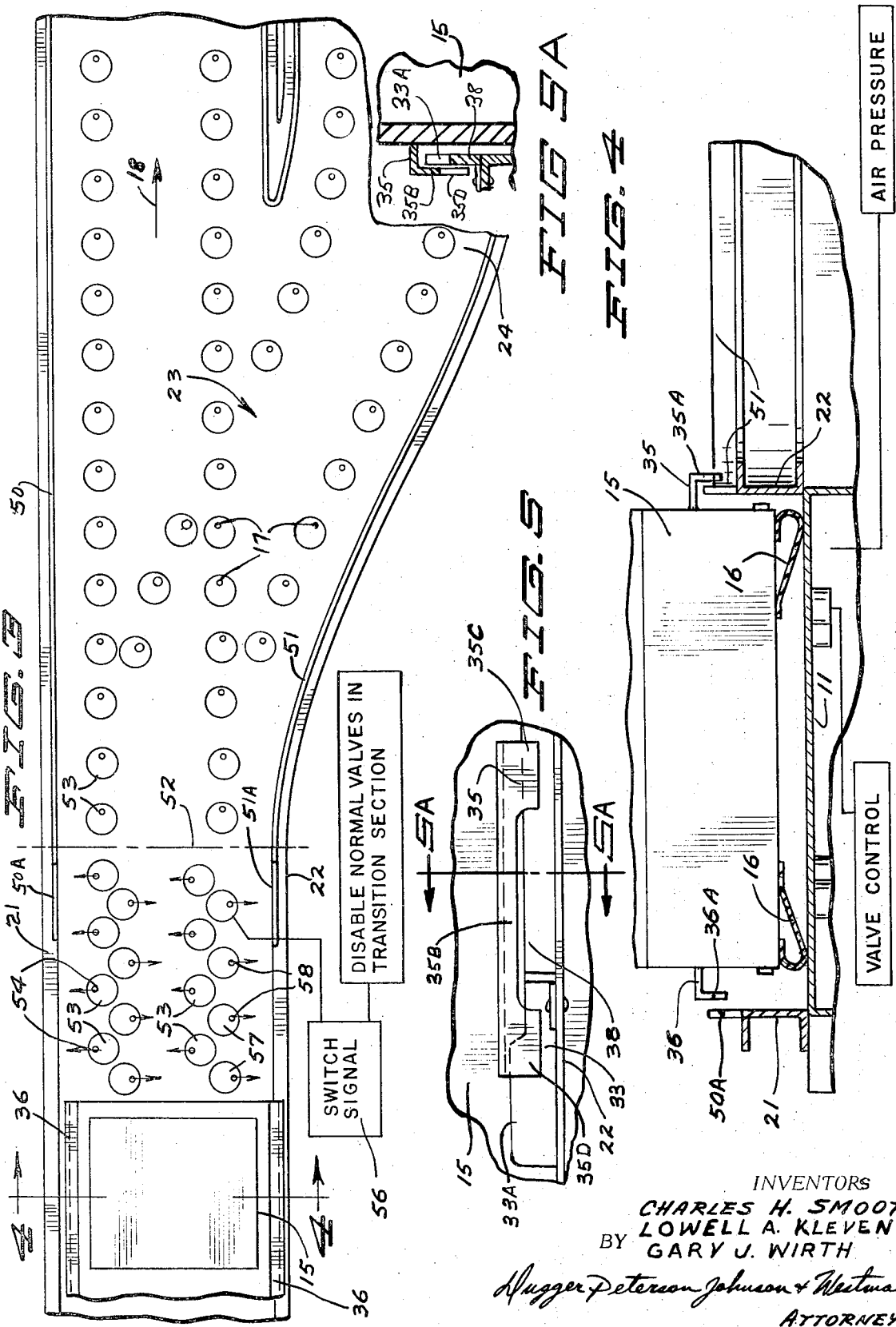

INVENTORS
CHARLES H. SMOOT
LOWELL A. KLEVEN
GARY J. WIRTH
BY Dugger Peterson Johnson & Westman
ATTORNEYS 3,808,977

SWITCH FOR VEHICLE GUIDEWAY

BACKGROUND OF THE INVENTION

1. Field of the Invention

The present invention relates to levitated vehicles operating on guideways and more particularly to a switching means for switching the vehicles from one guideway to another.

2. Prior Art

Levitated vehicles have been used previously for transporting people or other materials. For example, the United States patent to Berggren, U.S. Pat. No. 3,242,876, discloses an air-levitated vehicle system, which utilizes a free switching system for changing from one guideway to another for use in stations for picking up passengers and the like.

Other patents which show generally similar systems include the patent to De LaSalle, U.S. Pat. No. 3,340,822, and Connors U.S. Pat. No. 3,257,964. However, the need for positive switching has remained.

SUMMARY OF THE INVENTION

A switching system for levitated vehicles operating along guideways which guide movement of the vehicles between one location and another, wherein switching is desired to transfer the vehicle from one guideway to another in response to given signals. Switch guidance rails are provided, which cooperate with mating members on a vehicle so that when the vehicle engages one of the switch guidance rails, either for the main guideway or a side guideway, the vehicle will be mechanically moved into the desired guideway by the guidance rails as the vehicle moves along the guideway or tracks.

Prior to engagement of the guidance rails, means are provided for directing the vehicle toward one side or another of the guideways to become aligned with the desired guidance rail adjacent the intersection of the two guideways.

The means for guiding the vehicle to one side or another of the guideway comprise two different forms. One is a levitated form wherein nozzle jets used for levitating the vehicle will be oriented to direct the vehicle with air pressure toward one or the other of the sides of the guideway. A second form illustrates a movable section of a rail which in one position will direct the vehicle to one side of the guideway, and in a second position will direct the vehicle to the other side of the guideway and onto the side guideway.

The guidance rail switch system has a safety catch rail system to insure that once the catch rail is engaged the vehicle will be positively guided to the proper track.

BRIEF DESCRIPTION OF THE DRAWINGS

FIG. 1 is a fragmentary plan view of a vehicle track for levitated vehicles including switching means made according to the present invention;

FIG. 2 is a sectional view taken as on line 2—2 in FIG. 1;

FIGS. 3 and 4 are top plan and sectional views of a modified form of the switching means of the present invention;

FIG. 5 is a fragmentary side elevational view of a vehicle showing a typical guide and safety catch rail;

FIG. 5A is a sectional view taken as on line 5A—5A in FIG. 5;

DESCRIPTION OF THE PREFERRED EMBODIMENT

Figure 6:
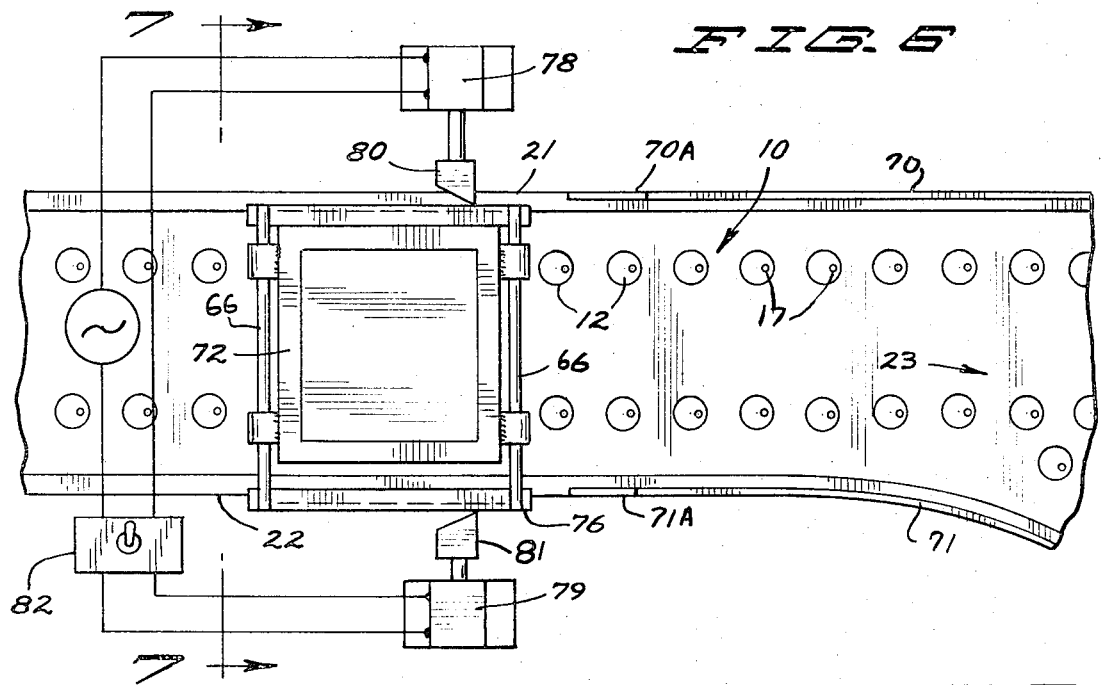
FIGS. 6 and 7 are top plan and sectional views of a modified form of the present invention.

Referring first to FIG. 1, there is shown a guideway or track illustrated generally at 10 which is used for a levitated vehicle. The guideway has a horizontal wall 11, through which a plurality of valves 12 are provided and which control flow of a fluid under pressure from an air pressure source 13 that supplies air to a duct 14 underneath the wall 11. The air pressure is quite low, but is sufficiently high so that when the valves 12 are open, a vehicle illustrated generally at 15 is levitated or floated along the top of the wall 11. The valves are flush with the top surface of wall 11 so they do not interfere with vehicle movement. The vehicle 15 can be provided with a peripheral sealing member 16 commonly called an "air bag seal" and well known in the art of levitated vehicles. The valves are automatically opening and can be of any desired or preferred type, either pilot operated or directly operated and as the vehicle passes over the valves 12, air pressure underneath the vehicle will cause the valves 12 to open, keeping the vehicle levitated. The valves can have nozzles illustrated generally at 17 for propelling the vehicles in a forwardly direction as indicated by the arrow 18.

The guideway assembly 10 includes side wall members 21 and 22, which keep the vehicle moving in the correct direction and provides side guides for the vehicle.

As shown, the side wall 22 has an open area 23 where it is interrupted, and the open area leads to a side or laterally offset track or guideway 24. The side guideway 24 also has a horizontal wall 25, valves 26 leading from a plenum chamber or duct to the top surface of wall 25, and upright side walls 27 and 28. The wall 27 is joined to and curves from a section of wall 22. The side guideway is in operative connection with the main guideway.

The side guideway or track 24 opens to the plenum chamber or duct 14 below the track, so that the valves 26, when they open will supply air to levitate a vehicle and will move the vehicle along the side guideway through the use of nozzles just as on the main guideway.

In the switching area, i.e., open portion 23 and immediately preceding it in the normal direction of movement, the walls 21 and 22 are provided with catch rails for determining which direction the vehicle will go, either to the side guideway, or to continue to go straight on the main guideway.

The catch rail above the wall 21 comprises an upright catch rail member 31 which is fastened to the side wall 21 and extends along the wall 21 for a distance past the open area 23 between the side guideway and the main guideway. The rail has a raised safety position 31A at the starting end. A divider member 32 is provided for dividing the main guideway and side guideway.

The wall 22 has a movable catch rail section 33 that is pivotally mounted about an upright axis indicated at 34 to this side wall 22, and which forms the starting portion of an upright catch rail 38 mounted onto the top of the side wall 27 of the side guideway. The pivotal mounting of the movable section 33 can be on a pivot pin forming a hinge action. The movable section 33 can be moved between the solid line and dotted line positions. The movable section 33 includes a raised safety rail portion 33A at the leading end thereof.

The vehicle 15, as shown, has mechanical guide means or catch skids on opposite sides thereof, as shown in FIG. 2. There is a catch skid 35 adjacent and above the wall 22 (and wall 27 when the vehicle is on the side guideway), and there is a catch skid 36 that is adjacent the wall 21. These catch skids are inverted U-shaped members having outer side members 35A and 36A respectively.

The side members 35A and 36A have center safety skid portions 35B and 36B, respectively, with short depending end skid portions 35C and 36C at the forward ends of the catch skids, with depending end skid portions such as 35D at the rear ends thereof. Referring to FIGS. 5 and 5A, a typical safety skid and safety catch rail are shown. The two depending end skid portions, which are spaced apart, engage the normal height catch rails 31 and 38 at two points, front and rear, and the center portion 35B or 36B clears the top of the normal height rails 31 and 38. Thus, in curves the catch rails can bulge outwardly under the center portions of the catch skids and the vehicle will always be stable under the two point guidance of the depending front and rear safety catch skid portions. However, at the start of the rails, the raised safety rail portions are high enough so the center skid portions 35B or 36B will also engage these safety catch rail sections and the vehicle is thus positively guided to position wherein the depending front and rear catch skid portions will both be on the same side of the catch rail they are associated with. This gives a safety feature for introduction of the vehicle to the catch rails. If the forward end skid portion 35C, for example goes on the outside of the rail portion 33A and thus on the outside of the normal height rail 33 and rail 37, the center skid portion 35B will guide the unit along the raised portion 33A to insure that the rear skid 35D will also go on the outside of rail 37. Conversely, if the forward end skid 35C goes on the inside of the rail section 33A, the center portion 35B will guide against the raised portion 33A to insure that the end skid 35D also goes on the inside of the rail section. If the catch rail was the same height as the lower part of the rail, it would be possible to have the forward end skid 35C go on the inside of the catch rail and the rear end skid 35D go on the outside of the rail. The movable catch rail section 33 is controlled for movement about its pivot 34 between its solid line position shown in FIG. 1, and the dotted line position in FIG. 1 through the use of a mechanical linkage such as a hydraulic cylinder or such as a solenoid actuator 37 shown schematically in FIG. 1.

The solenoid 37 is controlled through a switching signal means that may be from an automatic control or from a manual control (push button switch) and which indicates that a vehicle is supposed to be switched. The solenoid 37 when energized moves the section 33 to its solid line position shown in FIG. 1. This is the switching position. In this position, the catch skid 35 of the vehicle hooks onto the rail 33, and the forward end skid portion 35C goes on the outside of the raised safety catch rail section 33A and also then on the outside of rail 38. The safety rail section also slides along the inside of the center skid portion 35B and guides the depending skid portion 35D on the outside of rail section 33 and rail 38. The vehicle will thus be guided along rail 38. The vehicle will be moved out of the main guideway to the side guideway 24 and the movement is sufficient so that skid 36 clears rail portion 31A, as shown in dotted lines. The valves 26 will be automatically operated and the vehicle will be propelled along in proper direction, and will be held from movement along the main guideway by catch rail 38.

The switching thus is mechanically positive, and after the vehicle has moved beyond the divider point 32, the catch rail can be terminated so that the vehicle will merely move along the side guideway in a normal manner between the walls defining the side guideway.

If the unit is to continue to go straight, solenoid 37 will be relaxed (the unit includes a spring to return it to this position), and the movable catch rail section 33 will be moved to its dotted line position. Then, when the vehicle moves along in direction as indicated by the arrow 18, the depending portion 35C and safety skid portion 35B of the vehicle catch skid 35 will engage the inside of rail section 33 at 33A, and the vehicle will be guided over toward the wall 21, so that the depending forward end 36C of the catch skid 36 will go on the outside of the safety catch rail section 31A fastened to the wall 22, and thus on the outside of catch rail 31. The catch rail 31 will hold the vehicle 15 in a straight path, all the way past the open area 23 and on past the divider 22 until the vehicle is safely onto the main guideway again, past the open area. The vehicle will just continue to move along in its normal way under the influence of the automatically opening valves 12. The catch rail 31 terminates at a position to insure that the skid 36 will miss the end of the rail when the vehicle is being switched to the side guideway. The catch skids are made of a size so that they will engage the proper rail for guidance across the transition zone.

Thus, the use of two point contact catch skids for guiding the vehicle with a safety rail and skid combination at the start of switching is utilized so that the vehicle is failsafe mechanically guided to the desired guideway.

The movable rail section 33 provides means for selecting which catch rail the vehicle is guided on. The section 33 can be actuated in any desired manner.

A structure substantially the same is shown in FIG. 3. Here the vehicle 15 is on a main guideway, having levitating valves on the main portion of the guideway. However, here the walls 21 and 22 are provided with stationary fixed upright catch rails 50 and 51, respectively, having safety raised end portions 50A and 51A respectively. The guide rails start just ahead of the intersection between the main guideway and the side guideway 24. The section of the main guideway to the left of a line shown at 52, is provided with two sets of levitating valves. A first set of valves indicated at 53 are controlled through a valve control signal when the vehicle is to go straight. In this instance, the valves 53 have nozzles 54 which direct air blasts generally toward the wall 21, and will move the vehicle 15 over toward this wall 21 so that the catch skid 36 (also having depending end portions 36C and 36D) will go on the outside of the catch rail 50. The vehicle is levitated so that it moves forwardly in direction as indicated by the arrow 18 in FIG. 3 as well. The valves 53 are shown with arrow indicating an air blast going directly toward the wall 21 but the air blast could be directed at oblique angles if desired, or additional valves to maintain forward motion can be supplied, if necessary. The catch skid 36 and catch rail 50 will keep the vehicle going straight through past the open area 23 between the guideways. The first set of valves 53 would be the normal ones used under normal operation, and unless otherwise disabled these valves will automatically open as the vehicle came over them and the vehicle would normally go straight through, along the main guideway.

However, on a suitable signal shown schematically at 56 coming from an automatic control box as shown or from some other source, the valves 53 are closed off by suitable controls, and a set of valves 57 are actuated. The valves 57, as shown, have nozzles 58 which direct air from the duct or plenum chamber under the guideway so that the air tends to move the vehicle 15 laterally toward the wall 22. The air blasts here also can be made oblique to keep the vehicle moving forwardly, or the valves 57 can be in addition to valves used for forward propulsion. In this instance, then, the catch skid 35 would go to the outside of the catch rail at 51, and the depending wall 35A would hold the vehicle 15 so that the vehicle slides along the curved wall 27 and catch rail 51 into the side guideway 24. The valves in the side guideway open as the vehicle passes over them and the vehicle is propelled forwardly as it is levitated along.

The nozzles 58, and also the nozzles 54 can be forwardly directed somewhat to not only move the vehicle to the side as it enters the zone of switching, but move them forwardly as well. A lateral component of force must be present, however.

Figure 7:
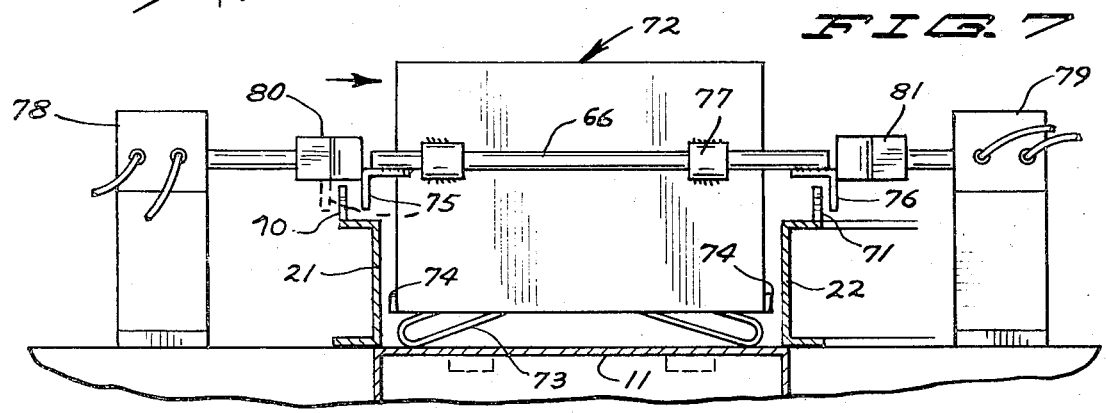

Referring to FIGS. 6 and 7, and a further modification, it can be seen that the track 10, illustrated immediately ahead of its switching position is of the usual form, and has the automatic valves 12 positioned for levitating the vehicle from the pressure in a plenum chamber under the track. The track has upright side guide walls 21 and 22, as before. However, in this form of the invention, where the track starts to divide for a spur or side track, as at 23, and adjacent the entry portion of the side tracks, the side walls have fixed catch rails 70 and 71, respectively attached thereto, which are upstanding above the side walls 22 and 21. The catch rails 70 and 71 have raised end portions 70A and 71A. The catch rails are near the outside edges of the flanges on the side guide walls 21 and 22. A vehicle 72 is shown situated in the track between the walls 21 and 22, and the vehicle 72 has the flexible bag seals 73 which are the same as the seals 16 previously described. The vehicle is levitated by fluid under pressure coming up through the track floor 11, and suitable bumpers 74 can be provided on opposite sides of the vehicle to hold it centered between the walls 21 and 22. The sliding bumpers or guide members 74 merely slide along the sides of the guide walls 21 and 22.

In order to facilitate switching, the vehicle itself is provided with catch skids on opposite sides thereof. The catch skids are illustrated at 75 and 76, respectively. The catch skids in the form shown are elongated, and extend substantially for the length of the vehicle and are mounted onto transverse support members 66 at the front and rear of the vehicle. The transverse support members are slidably mounted in housing 77 fixed to the vehicle walls, so that the support members 66 can slide back and forth depending on how they are positioned. The skids have the two short depending end skid portions at the front and rear, and a center safety skid portion similar to the skid 35.

In order to effect switching, a pair of solenoid members 78 and 79, having guides 80 and 81, respectively, on the outer ends thereof are positioned on opposite sides of the track, and are connected through a suitable switch 82 to a source of power in parallel, but in reverse action. In other words, when the guide 80 is extended by the solenoid 78, the guide 81 is retracted back against or away from the side member 22 by the solenoid 79.

In this manner, the switch 82 can position the guides 80 and 81 properly to engage the catch skids 75 or 76 and move them over to one side or the other of the vehicle. For example as shown in FIG. 6, with the guide 80 extended, and the guide 81 retracted, the guide 80 will engage the catch skid 75 and push the entire catch skid assembly including the supports 66 outwardly away from the catch rail 70 and over so that the catch skid 76 will go on the outside of the catch rail 71 and the vehicle will be switched.

Opposite operation, namely the extending of guide 81 and retraction of the guide 80, will push the catch skid 76 away from the catch rail 71, and the catch skid 75 will then engage the catch rail 70 and the vehicle 72 will be maintained in its straight through course along the track without any switching.

Of course, the valves 12 will operate in the same manner as before and the vehicle 72 will be levitated and pro-pelled along. The switching, however, is mechanical, positive, and can be programmed through a manual switch 82 or any other desired automatic switch signal.

Figure 8:
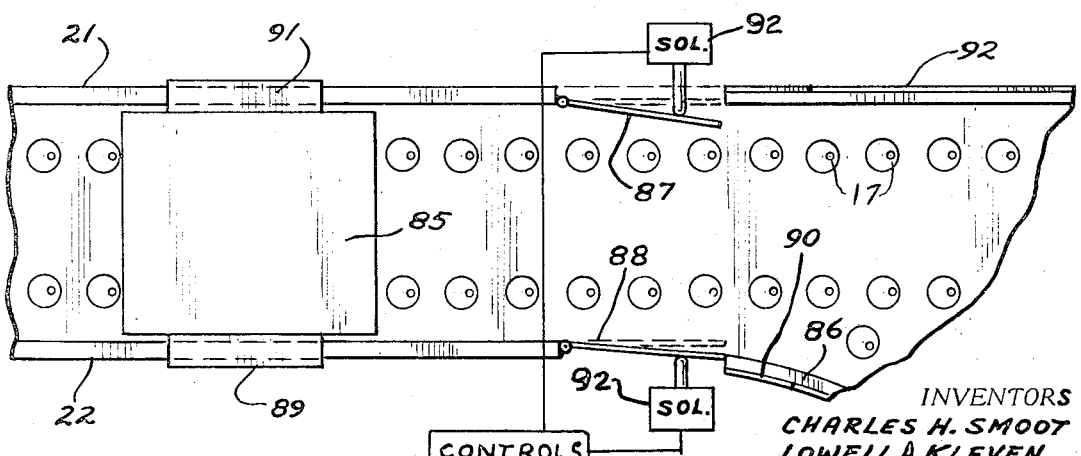
FIG. 8 is a top plan view of a further modified form of the invention.

FIG. 8 shows a further modified form of the invention wherein a vehicle 85 is propelled along the track, toward a switching area and side track. The vehicle 85 goes on the track 10 between guide walls 21 and 22, as before, and is levitated by automatically opening valves 12. However, in this instance one or both of the guide walls 21 and 22 are interrupted just before the side track is arrived at. The branch side wall is shown at 86, and as shown, the side guide walls include movable sections 87 and 88, respectively operated by suitable solenoids 92 or other controls such as pneumatic cylinders or hydraulic cylinders so that in a first position as shown in solid lines, the guide 87 will push the vehicle 85 over against the guide rail 88 on the opposite side, which is in the switch position, and the catch skid 89 (made as in FIG. 5) on the vehicle 85 will engage a catch rail 90 on the switch track, and be guided onto the side track.

With the switch guide wall sections 88 and 87 in their dotted line position as shown in FIG. 8, the guide 88 will engage the side of the vehicle 85 and keep the vehicle going straight so that the catch skid 91 on the vehicle will engage the catch rail 92 on the straight track, and the unit will be guided across the transistion area. The guide wall sections 88 and 87 can be pivoted to the stationary side guide walls with suitable hinges or pivot pins. Only one of the movable sections, for example section 87, may be used, if desired.

On all of the catch rails and catch skids, the configuration shown in FIG. 5 can be utilized so that the unit will have fail-safe switching.

In the second form of the invention, the means to direct the vehicle to one or the other of the mechanical catch rails, comprises valves that use a fluid blast for this direction.

The mechanical means shown are preferred, because they provide positive mechanical movement of the vehicles with merely having at least one movable section that accomplishes the movement of the vehicle to the proper side of the guideway. Catch skids are simple to make, as are the catch rails, and do not add appreciably to the cost of the vehicle. The catch rails and skids should be long enough so that they will provide stability for the vehicle and will prevent the vehicle from freezing or catching against the side wall. The catch skids are made so that they only contact the catch rail in the front and rear ends thereof for positive two point guidance.

There is very little force needed for straight through guidance of vehicles past the switch area, so in some instances only one catch rail, which provides the positive force necessary to cause a vehicle to diverge from the main track, is used. The straight through motion is then without positive guidance. As shown, however, positive guidance is provided for straight through motion as well as switching.

The use of catch rails while merging vehicles from a side track into a main track is also contemplated. The vehicles would in effect be going in opposite direction from that shown and the catch rails would be used to keep them following along the merging track section properly to prevent the vehicle from twisting or cocking in the transition area 23. For example, the catch rail 50 would guide a vehicle on the straight track past the area 23, and the rail 51 would guide a vehicle on track 24 so it merged smoothly into the main track.

What is claimed is:

1. In a fluid levitated vehicle system comprising guideway means including a main guideway and a side guideway merging with said main guideway, said guideway means comprising a support floor for said vehicle and at least one side guide member extending upwardly from said support floor of said guideway means to define a path of travel for said levitated vehicle along the support floor, a vehicle for movement along said guideway means in a normal direction, means for levitating said vehicle with respect to said guideway means, said guideway means including means for determining the path of vehicle movement in the merging area where said main guideway and said side guideway merge comprising a first catch rail extending above said support floor along a side of said main guideway in the region of said merging area, a second catch rail extending above said support floor along a side of said main guideway adjacent the commencement of said merging area in relation to normal vehicle movement and extending along the outer side of said side guideway, catch skid means on opposite sides of said vehicle, a first of said skid means being alignable with said first catch rail, and the other of said skid means being alignable with said second catch rail, and means for selectively guiding one of said catch skid means toward its associated catch rail prior to the time said levitated vehicle becomes transversely aligned with the respective catch rails, whereby the levitated vehicle is mechanically guided by engagement between the one catch rail and its corresponding catch skid means in the merging area as said vehicle is supported by levitating fluid.

2. The combination as specified in claim 1 wherein said means for guiding said catch skid means comprises a movable catch rail section on at least one of said catch rails, said catch rail section being movable from a first position wherein it will engage a catch skid means of said vehicle on the first side thereof and guide said vehicle along the movable catch rail section, and in a second position will guide a catch skid means of said vehicle toward the opposite catch rail.

3. The combination as specified in claim 2 wherein said guideway means have support walls, and said catch rails comprise upright wall members extending above the general plane of said support walls.

4. The combination as specified in claim 2 wherein said movable section of said catch rail is mounted for pivotal movement between first and second positions, and power means for pivoting said movable catch rail section in at least one direction of movement in response to a predetermined signal.

5. The combination as specified in claim 1 wherein said means for guiding said catch skid means comprises selectively operable valve means supplying levitating fluid to said vehicle, and having nozzle means oriented to provide a vehicle movement component toward one or the other of said catch rails.

6. The combination as specified in claim 1 wherein said levitated vehicles have side walls and each catch skid means comprises an outer wall means spaced from and supported by an adjacent levitated vehicle side wall and wherein the outer wall means is on the opposite side of its respective catch rail from the adjacent levitated vehicle side wall when the catch skid means is aligned with its catch rail.

7. In a pneumatic propulsion transportation system the combination of guideway means, a vehicle levitated for movement along said guideway means, said guideway means including a generally horizontal wall portion and laterally spaced side wall portions projecting upwardly from said generally horizontal wall portion defining a first guideway, means defining a second guideway laterally displaced from said first guideway and in operative connection therewith, said second guideway having an upstanding outer boundary wall member merging with a first of said side wall portions, a first catch rail on said first side wall portion and said outer boundary wall and projecting upwardly from the walls, a second catch rail on a second of said side wall portions, and extending along said second side wall portion past the operative connection of the first and second guideways, said catch rails being positioned only in the region where the first and second guideways are connected, first and second mechanical guide means on said vehicle selectively engageable with one of said first and second catch rails respectively, and means to position one of said mechanical guide means in engageable position with its respective catch rail to movably guide a vehicle along the desired guideway at the operable connection between said first and second guideways.

8. The combination as specified in claim 7 wherein said means to position one of said mechanical guide means comprises a movable catch rail section on at least one of said catch rails, said catch rail section being movable from a first position wherein it will engage one mechanical guide means of said vehicle and guide said vehicle along the movable catch rail section, and in a second position it will clear said one mechanical guide means.

9. The combination as specified in claim 8 wherein said movable section of said catch rail is mounted for pivotal movement between first and second positions, and power means for pivoting said movable catch rail section in at least one direction of movement in response to a predetermined signal.

10. The combination as specified in claim 7 wherein said means to position one of said mechanical guide means comprises valve means supplying levitating air to said vehicle and having nozzle means oriented to provide a vehicle movement component toward one or the other of said catch rails.

11. The combination as specified in claim 7 wherein each of said mechanical guide means are movably mounted on said vehicle from catch rail engaging to catch rail clearing positions and when one mechanical guide means is in rail engaging position the other mechanical guide means is in rail clearing position, and means to actuate said mechanical guide means to their respective positions.

12. The combination as specified in claim 7 wherein said means to position one of said mechanical guide means comprises movable wall portions in each of said guideway side walls, said movable wall portions being transversely aligned and operable simultaneously, said wall portions being movable to engage said vehicle and direct said vehicle and one of said mechanical guide means thereon toward engagement with one of said catch rails when said wall portions are in a first position and to engage said vehicle and move the other of said mechanical guide means toward engagement with the other catch rail when the wall portions are in a second position.

13. The combination as specified in claim 7 wherein said mechanical guide means each comprise a downwardly depending wall having spaced fore and aft end portions that depend downwardly farther than the center portion thereof, said catch rails having a main portion of height to engage only the two end portions of the respective depending wall, and said catch rails each further having a raised portion adjacent the leading end of the catch rails projecting upwardly a sufficient distance to terminate above the lower edge of the center portion of the respective depending wall.

14. In a conveyance device, the combination of guideway means, a vehicle levitated by fluid under pressure supplied from said guideway means and being movable along said guideway means, said guideway means including a base wall and laterally spaced first and second side wall portions projecting upwardly from the base wall to define a first guideway, means defining a second guideway laterally displaced from said first guideway and in operative connection therewith, said second guideway having an upstanding outer boundary side wall portion merging with said first of said side wall portions, a first catch rail means on at least one of said side wall portions and projecting upwardly from the one wall portion adjacent the operative connection of the first and second guideways only, said catch rail including a raised rail portion of greater height than other portions of said catch rail, skid means on said vehicle engageable with said catch rail means to be guided solely by said catch rail means in the area of merger of said first and second guideways, said skid means comprising a downwardly depending wall mounted on said vehicle having spaced fore and aft end portions and a center wall portion, said raised rail portion projecting upwardly above the bottom margin of said center wall portion and said fore and aft end portions of said skid means depending to overlap the other portion of said catch rail, said other portion having an upper edge below the lower edge of the center wall portion of said skid means, and means for selectively positioning said catch rail means and said skid means in position for guidance of said vehicle along said catch rail means.

15. The combination as specified in claim 14 wherein said skid means is movably mounted on said vehicle from a catch rail engaging position wherein the vehicle is guided along said catch rail, to a catch rail clearing position.

16. The combination as specified in claim 14 wherein said means for selectively positioning catch rail means and said skid means comprises movable side wall sections in said side walls, said side wall sections being movable to engage said vehicle and move said vehicle toward said catch rail so that said skid means engages said catch rail and selectively to move said vehicle away from said catch rail.

* * * * *

PO-1050
(5/69)

UNITED STATES PATENT OFFICE
CERTIFICATE OF CORRECTION

Patent No. 3,808,977                Dated May 7, 1974

Inventor(s) Charles H. Smoot, et al.

It is certified that error appears in the above-identified patent and that said Letters Patent are hereby corrected as shown below:

Column 8, line 39, (Claim 7 Twice Amended, line 6) before "defining" (first occurrence) insert --thereby--.

Signed and sealed this 24th day of September 1974.

(SEAL)
Attest:

McCOY M. GIBSON JR.              C. MARSHALL DANN
Attesting Officer               Commissioner of Patents